United States Patent
Nair

(10) Patent No.: US 8,850,587 B2
(45) Date of Patent: Sep. 30, 2014

(54) NETWORK SECURITY SCANNER FOR ENTERPRISE PROTECTION

(75) Inventor: Bini Krishnan Ananthakrishnan Nair, Bangalore (IN)

(73) Assignee: Wipro Limited, Bangalore (IN)

( * ) Notice: Subject to any disclaimer, the term of this patent is extended or adjusted under 35 U.S.C. 154(b) by 1293 days.

(21) Appl. No.: 11/744,224

(22) Filed: May 4, 2007

(65) Prior Publication Data

US 2008/0276295 A1 Nov. 6, 2008

(51) Int. Cl.
*H04L 29/06* (2006.01)
*G06F 21/57* (2013.01)
*G06F 21/55* (2013.01)
*H04L 12/24* (2006.01)

(52) U.S. Cl.
CPC ............ *G06F 21/577* (2013.01); *G06F 21/554* (2013.01); *G06F 21/552* (2013.01); *H04L 41/044* (2013.01); *H04L 41/12* (2013.01); *H04L 63/1433* (2013.01)
USPC ................... 726/25; 726/1; 726/15; 709/223; 709/224; 709/225; 709/229

(58) Field of Classification Search
USPC ......... 726/1–6, 15, 22–27; 709/223–225, 229
See application file for complete search history.

(56) References Cited

U.S. PATENT DOCUMENTS

| | | | |
|---|---|---|---|
| 5,121,345 A | 6/1992 | Lentz | |
| 5,623,600 A | 4/1997 | Ji et al. | |
| 5,684,875 A | 11/1997 | Ellenberger | |
| 5,832,208 A | 11/1998 | Chen et al. | |
| 5,892,903 A | 4/1999 | Klaus | |
| 5,931,946 A | 8/1999 | Terada et al. | |
| 5,960,170 A | 9/1999 | Chen et al. | |
| 6,108,782 A | 8/2000 | Fletcher et al. | |
| 6,266,774 B1 | 7/2001 | Sampath et al. | |
| 6,298,445 B1 | 10/2001 | Shostack et al. | |
| 6,338,141 B1 | 1/2002 | Wells | |
| 6,347,375 B1 * | 2/2002 | Reinert et al. ................... | 726/24 |
| 6,721,721 B1 | 4/2004 | Bates et al. | |
| 6,892,227 B1 | 5/2005 | Elwell et al. | |
| 7,000,247 B2 | 2/2006 | Banzhof | |
| 7,062,783 B1 | 6/2006 | Joiner | |

(Continued)

OTHER PUBLICATIONS

Wu et al., "Integrated Vulnerability Management System for Enterprise Networks," e-Technology, e-Commerce and e-Service, 2005, IEEE'05 Proceedings, The 2005 IEEE International Conference., pp. 698-703.*

*Primary Examiner* — Pramila Parthasarathy
*Assistant Examiner* — Hee Song
(74) *Attorney, Agent, or Firm* — LeClairRyan, A Professional Corporation

(57) ABSTRACT

A method of monitoring levels of security conformity and preparedness of a plurality of network connected computing machines, obtains a report by remotely scanning the machines in segments. The machines might already be connected to commercial security software and a patch dispenser. The report includes definition dates and any files quarantined by the commercial security software, patch-management-software communication present and the patches received. The method uses the report and software (not installed on the scanned machines) to produce a Network Security Scanner for Enterprise Protection output to perform a security-preparedness audit of the scanned machines. The audit non-intrusively ascertains. If the scanned machines conform to user-defined fields and policies, and assists in selective security updating of the machines. The scanning, unrecognized by the scanned machines may be configured to suit their OS, and done periodically as desired. A computer readable medium executing the method is included.

25 Claims, 8 Drawing Sheets

(56) References Cited

U.S. PATENT DOCUMENTS

| | | |
|---|---|---|
| 7,152,105 B2 | 12/2006 | McClure et al. |
| 7,152,164 B1 | 12/2006 | Loukas |
| 7,243,148 B2 * | 7/2007 | Keir et al. ............ 709/224 |
| 7,257,630 B2 * | 8/2007 | Cole et al. ............ 709/224 |
| 7,664,845 B2 * | 2/2010 | Kurtz et al. ........... 709/224 |
| 2001/0034847 A1 | 10/2001 | Gaul, Jr. |
| 2006/0095961 A1 * | 5/2006 | Govindarajan et al. ...... 726/15 |
| 2006/0101517 A1 * | 5/2006 | Banzhof et al. .......... 726/25 |
| 2006/0101519 A1 * | 5/2006 | Lasswell et al. ......... 726/25 |
| 2006/0195566 A1 * | 8/2006 | Hurley ................ 709/224 |
| 2007/0143851 A1 * | 6/2007 | Nicodemus et al. ........ 726/25 |
| 2008/0092237 A1 * | 4/2008 | Yoon et al. ............ 726/25 |
| 2008/0262863 A1 * | 10/2008 | Stickley et al. ........... 705/1 |

\* cited by examiner

NETWORK SECURITY SCANNER FOR ENTERPRISE PROTECTION

FIELD OF THE INVENTION

The present invention generally relates to remote access monitoring of computing and related machines. More specifically, this invention relates to a system and computer program product for monitoring a plurality of computing machines in a company-network to ascertain, whether the machines are up-to-date with the company security policies and needs.

BACKGROUND OF INVENTION

Ensuring system security in computing machines is heavily dependent on the proper use of an up-to-date version of antivirus protection, antivirus signature and a reliable system patch environment. Ensuring proper security of the various computing machines in a company is of paramount importance since the computing machines are exposed to a high level of software security vulnerability. Several types of vulnerability are known, including buffer overrun, privilege elevation and validation flaw, to name a few. The vulnerability could be caused by any virus, worm, Trojan horse or any other malicious effort from intruders. The vulnerabilities are highly undesirable and cause deleterious consequences to the company or organization. In situations where a multitude of processing units and computing platforms within the network of a company need to be monitored as to their readiness for offering up to date security and protection, there is no known simple mechanism or software available to check whether all the machines in the network are up-to-date with the company security policies, and to provide a combined report of necessary data.

It is known to use antivirus solutions and patch management to address issues of network security in individual and group-connected computing machines which might be part of a network. Most of the antivirus solutions available in the market might have a built-in audit tool, which is at best not effective in taking total stock of the defects with the clients, for certain purposes. The ineffectiveness of the available antivirus solutions is because the built-in audit tool will not detect the security-preparedness of the client machine if the administrator-privileged-users stop the corresponding services in their workstation. Also, the report generated by available tools does not contain the complete information needed by the security administrator. To continue to obtain a full scan of computers in a single segment, it also requires significant time (sometimes more than twenty five minutes) for engineers striving to have control over virus defects in the system, in initiate corrective actions. There have been situations where a dedicated system security or an IT engineer was deployed and had to spend almost a whole day for checking the antivirus console and for auditing the systems but still was unable to have full control. This setback and the increasing trend of virus incidents in many companies has resulted in a major negative observation in internal audits, adversely impacting on efficiency and productivity while impeding an effort to fix these issues.

Patch Management Overview

It is known that a security patch is a broadly released fix for a specific product, addressing a security-vulnerability. A security patch is often described as having a severity rating, which actually refers to the MSRC (Microsoft Security Response Center) severity rating of the vulnerability that the security patch addresses. Patch management is the process of controlling the deployment and maintenance of interim software releases into production environments. It helps to maintain operational efficiency and effectiveness, overcome security vulnerabilities, and maintain the stability of the production environment.

The rise of widespread worms and malicious code targeting known vulnerabilities on unpatched systems, and the resultant downtime and expense they bring, is probably the biggest reason so many organizations are focusing on patch management. Along with these threats, increasing concern around governance and regulatory compliance (e.g. HIPAA, Sarbanes-Oxley) has pushed enterprises to gain better control and oversight of their information assets. Also, considering the addition in increasingly interconnected partners and customers, and the rise of broadband connections and remote workers, there results the perfect scenario that pushes patch management to the forefront of the list of security priorities of many organizations.

Patch management in certain scenarios is improper or inefficient since it might be based on lack of critical information, and lack of the Microsoft-Window® Software Update Services (SUS) configuration in client computers that are running on Windows® operating system. It has been observed that SUS is not installed or not configured properly in a considerable number of computer machines. The SUS console is generally not effective and there is no software available to find out the SUS configuration-details in a multiplicity of computers which are part of a network. Sometimes, there are issues because of an increasing trend of removing an IMG (IT Management Group) specific user account, resulting in improper updating of patches. There is another scenario wherein eventhough the SUS client is configured properly, when the SUS server machine pushes the patches, it may not update the client machine since the IMG user account was deleted or its password was changed. There is no easy provision to find out if the user account was indeed deleted or if the password was changed, whereby patch update is prevented.

Managing updates and patches for all the applications and operating system versions used even in a small company is fairly complicated, and the situation only becomes more complex when additional platforms, availability requirements, and remote offices and workers are factored in.

An organization or enterprise that cannot determine and maintain a required level of trust within its operating systems and application-software might have a number of security vulnerabilities, which, if left unaddressed, could lead to a loss of revenue and intellectual property. Minimizing this threat requires the availability of properly configured systems, use the latest security software, and installation of the recommended software patches and updates.

Accordingly, in a scenario where there is a large number of computers required to be monitored by an IT Management Group of a company to collect security status details on a periodical or daily basis, the monitoring and control becomes a formidable task in the absence of a system to address the issues efficiently.

Norton® antivirus installations provided by Symantec® are known to be commonly used for security purposes in privately owned computers as well as a host of computing machines owned by a bigger company and deployed in different geographic regions. Tracking of Norton® Antivirus defects and lack of upgrades across computing machines in different geographic locations become a real concern when the virus defects keep increasing in number and invasive ability, and the network engineers need to struggle to fix these issues in a timely manner. Even though Symantec® antivirus application offers a console, the console provided for Norton antivirus installations is not effective for some purposes. Use of the Symantec console is at best time-consuming, and it is not reliable for all requirements of the IT Management Group (IMG) in an organization.

Remote monitoring of computing machines, and related art:

U.S. Pat. No. 6,108,782 issued on Aug. 22, 2000 to Fletcher et al teaches distributed remote monitoring of network traffic which uses distributed nodes to collect traffic statistics. The statistics are forwarded to collectors which compile the statistics to create combined views of network performance. U.S. Pat. No. 6,892,227 B1 issued to Elwell et al on May 10, 2005 teaches system method and computer program product for analyzing a network utilizing a host controller/zone controller interface. U.S. Pat. No. 7,062,783 B1 issued to Joiner on Jun. 13, 2006 teaches a system and method for business rule-based network services utilizing a network, wherein initially, information relating to a plurality of computers is collected utilizing a plurality of agents coupled to the computers via a network.

Some of the earlier patents that are referenced above generally teach different methods or software solutions to scan, analyze, collect traffic statistics, and detect intrusions in a network. Some of the other earlier patents relate to detection of network vulnerability through a database of security-vulnerabiities, or through deploying vulnerability-information in a client computer, teach different methods to manage a client computer or detect unauthorized entry to a client computer in a client/server environment. Yet other prior patents teach different methods to check, prevent or diagnose the viruses infected on a computer in the network.

SUMMARY OF THE INVENTION

Provided herein is a Network Security Scanner for Enterprise Protection (NSSEP) which comprises software developed for the IT Management Group of a company for their daily or periodical monitoring of remote computers for security vulnerability and selective patch management. The present software can be implemented across geographic locations with no software installation needed on the monitored computers, and can drastically improve the virus prevention process and engineer-productivity, resulting in considerable cost saving to the organization. Any medium or large organization would benefit from a single solution as taught herein to secure and patch-manage their computers in an unobtrusive manner in a known network.

Ensuring that every system is free from vulnerabilities is a challenge and the prime responsibility as well as of paramount importance to an IT Management Group of any organization. The efficacy of system-security depends on the up-to-date antivirus version, antivirus signature and the system patch environment. In known art, some mechanisms exist to automate the updating of antivirus signatures and system patches. However, there is no software available to check whether a computer machine is up-to-date with the company security policies or to audit the systems in a network with respect to antivirus solution and Windows® Server Update Services client status and provide a combined report of necessary data from a multiplicity of computing machines owned by the company and situated in remote locations, NSSEP as described herein is an in-house solution that meets all IT Management Group requirements for most enterprises or companies to ensure conformity with user defined fields and policies and ensure network security without any software installation of the monitored machines. The NSSEP is compatible with Windows® based operating systems.

The present invention provides a system, method and computer program product that are provided for remotely accessing and scanning the computing machines incognito in the network to ascertain whether those are up-to-date with the company security policies. The present NSSEP is a software system that scans the remote computers by each segment and generates a report that perfectly caters the IT Management Group's requirements. In a typical application, the present NSSEP system in a single application would require just two minutes to scan a subnet with accurate results.

The present NSSEP software as described herein provides a very high accuracy and a very high level of performance. A command prompt compactable version of this software can be used to schedule the scan-operation and that is preferably executed through accessing the remote computers in batch files.

The invention in one form resides in a method of remotely monitoring levels of security preparedness of a plurality of computing machines for obtaining a report, with intent to assess and selectively upgrade the security preparedness of the computing machines, the computing machines being already connected to a receive security from a commercial security software, comprising the steps of: viewing and dividing a list of the plurality of computing machines into segments for remote access; selectively accessing computing machines in selected ones of the segments; remotely scanning the accessed machines in segments for obtaining a report of data including information relating to files quarantined by the commercial security software, and information relating to Software Update Services client present in the accessed machines; and, generating a NSSEP report using said data to ensure conformity with user defined security fields and policies present in the scanned computing machines and selectively perform a security preparedness audit of the scanned computing machines accessed through the segments.

The invention in a second form is slightly modified and resides in a method used by a network administrator for remotely monitoring levels of security preparedness and patch management of a plurality of computing machines for obtaining a report, with intent to assess and selectively upgrade the security preparedness of the computing machines, wherein the computing machines may already be connected to a receive commercial security software from one or more vendors. The modified method includes the steps of: viewing and dividing a list of the plurality of computing machines into for remote access; selectively accessing and scanning computing machines in selected ones of the segments; from the scanning obtaining a report of data including information relating to file quarantined by said commercial security software, and information relating to Software Update Services client present in the scanned computing machines as well as implemented patches; generating a NSSEP report using the data to perform a security preparedness audit of the scanned computing machines in the segments; and, selectively initiating corrective action to update security preparedness levels and implement patch management of the scanned computing machines as required.

In another form, the invention resides in method of remotely monitoring levels of security preparedness and patch management of a plurality of network connected computing machines for an enterprise IT Management Group to obtain a report, with intent to assess and selectively upgrade the security preparedness of the computing machines, the computing machines being already selectively connected to receive security protection from at least one commercial security software vendor, comprising the steps of: viewing and dividing a list of said plurality of computing machines into segments for remote access; selectively accessing computing machines in selected ones of the segments with no separate installation of any additional software in any of the plurality of the computing machines; remotely scanning the accessed selected computing machines in the segments without network disturbance or performance issues, including the step of configuring the steps of viewing and remotely scanning the computing machines with users of the scanned computing machines remaining unaware of the scanning, for obtaining a report of data including information relating to files quarantined by the commercial security software, and information relating to patch management software present in the selected computing machines as well as implemented patches; and, generating a NSSEP report using said data to perform a security preparedness audit of the scanned computing machines in the segments wherein said NSSEP report selectively includes required fields data of different software vendors' products; and, selectively initiating corrective action to update security preparedness levels and selectively implement patch management of the scanned computing machines as desired by the IT management Group. By implementing the NSSEP and applying it to a plurality of client machines that need to be monitored, complete workstation security and asset management can be achieved. The present approach can also be configured for pushing of files and applications, and taking the back-up of data from remote client machines. A command prompt compactable version of NSSEP is also available that can be scheduled and executed through a batch file.

The invention also includes a computer readable medium encoded with data instruction which when executed by a computing platform, results in execution of a method as recited above.

The present NSSEP enables achieving an efficient audit of systems and client machines present in the network (for example LAN) and checks whether the client machines are up-to-date with the company security policies and provides a combined report of all necessary data. In one form the NSSEP has the following features including functions and advantages:

Remotely scans every machine in the network for antivirus version, antivirus signature, Microsoft SUS client configuration, parent server information, any files that are quarantined, and operating system.

It scans the computers segment by segment, one segment (for example 255 machines) at a time, and generates a report in the server machine.

The combined report can be configured to contain combined information of different software vendor's products which information is useful for IT engineers to track the client machines and ensure that the systems are secure.

In a preferred form, the NSSEP combined report expediently contains the user configured fields like: Computer IP Address, Computer Name: MAC Address, Antivirus Version; Parent Server; Definitions, Files quarantined; SUS Status; Operating System and Computer Status.

Organizations have their own native ways to push security patches to client machines to avoid the huge license fees of third party products and network traffic. The NSSEP report enables clearly identifying those client machines in the network in which the client software is not configured.

Provide 100% accurate report.

Provide high performance. In one form, NSSEP takes only two minutes to scan a segment and can be used for daily monitoring of remote client computers for security vulnerability.

The NSSEP report also indicates whether the admin privileged user/its password created by the IT department in all the machines is changed/removed, and such information can be used for updating of patches remotely.

Advantageous features:

No extra software needs to be installed separately and hence no need to restart the client machine when the present software is used.

No network disturbance is caused while scanning the client machines.

No scanning of files in the client machine needs to be done.

No performance issues arise in client machines since scanning getting completed with in seconds and the service stops by itself.

By enhancing this NSSEP solution, complete workstation security and asset management can be achieved.

BRIEF DESCRIPTION OF THE DRAWING

A more detailed understanding of the invention may be had from the following description of embodiments, given by way of example and to be understood in conjunction with the accompanying drawing wherein.

DETAILED DESCRIPTION

A detailed description of one or more embodiments of the invention is provided below to be understood in conjunction with the accompanying figures that illustrate by way of example the implementation of embodiments of the invention. While the invention is described in connection with such embodiments, it should be understood that the invention is not limited to any specific embodiment. On the contrary, the scope of the invention is limited only by the appended claims and the invention encompasses numerous alternative, modifications and equivalents. For the purpose of example, numerous specific details are set forth in the following description in order to provide a thorough understanding of the present invention.

The present invention may be practiced according to the claims without some or all of these specific details. For the purpose of clarity, technical material that is known in the technical fields related to the invention has not been described in detail so that the present invention is not unnecessarily obscured.

Figure 1:
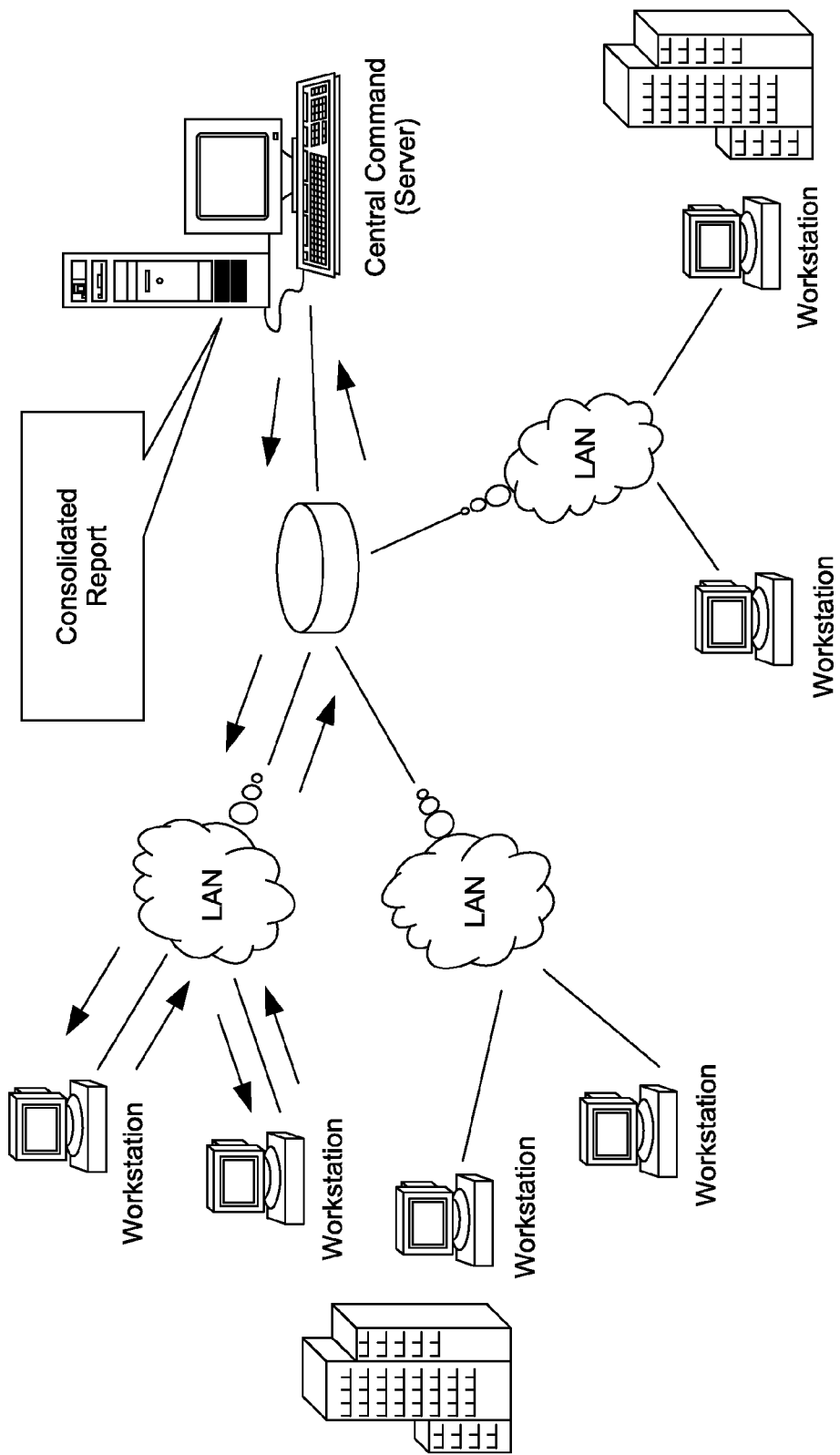
FIG. 1 illustrates an exemplary MFC Application Executable central command server.

The illustration in FIG. 1 shows an exemplary central command server that initiates scanning of remote computing machines which are provided with commercial antivirus and security coverage (e.g., Symantec®) and some of which might be part of one network or another. Some of the remote computing machines might include those located in different geographical regions. The remote computing machines are accessed expediently in segments, to ultimately generate a consolidated report using the present NSSEP.

The software system of the NSSEP consists of an Executable Application and a Service. The network administrator or the IT engineer runs the Executable (service exe) from the central command server giving the IP address range in a thread as one of the inputs. The Executable takes the first IP Address from the given input list and starts the login to the remote machine. Once logged into the remote machine, the Executable tries to start the service by assuming that the service is already deployed there. This is done to improve the performance by avoiding repeated deployment in subsequent runs. If however the service is not present, then the process installs the service and starts it. From this point onwards the execution shifts to the service and the communication is from the server to the client. Now the Executable closes the connection and reconnects later to the port of the remote computing machine to get the data. Once the service confirms that the Executable starts listening to its port, it writes the data to the port in the required format. When it is certain that the port is read by the Executable, then the service closes the port and the service stops and disconnects by itself. Finally, the Executable gets the data closes the socket and returns back to the thread. The thread might execute a group of fifty IP addresses. The same procedure will be followed till the end of IP address in the given segment and at the end, the output will be written preferably into an excel format file as a report.

Figure 2:
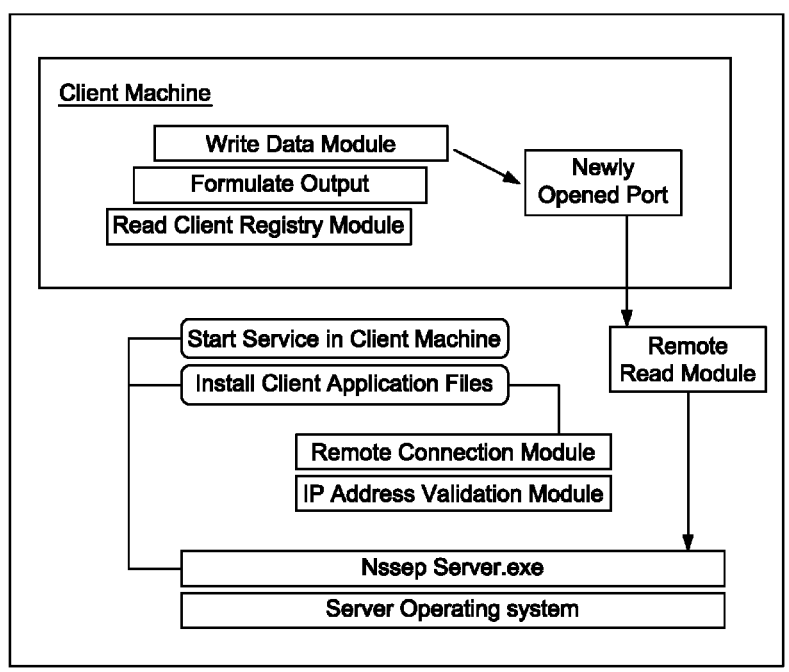
FIG. 2 shows an example of Software Architecture used in the implementation of the present NSSEP system.

FIG. 2 illustrates an exemplary client machine showing the server operating system. NSSEP server exe, IP address validation module and the remote connection module to initiate scanning the client computing machines remotely. The initiation of scanning starts service in the client computing machines and installs client application files as shown in FIG. 2. At each client machine the scanning utilizes a read-client registry module, formulate-output module and a write-data module, as illustrated. Interacting with the foregoing modules at each client machine is a port (for example port #27015) which is connected to a remote read module that assists in generating the required consolidated report.

The report generated by this NSSEP software preferably includes the client computer details. Anti-virus details including Parent server information and Definition, whether way files are quarantined, Software Update Services client configuration and the Operating System details. With the help of this NSSEP tool and a report generated therefrom, the IT Management Group in an organization is able to reduce the virus defects drastically. From the report, an engineer can identify non-Windows machines in a network and can also check whether the computing machines present in each development center has the client specific Operating system. By the present approach virus defects are proactively monitored so that corrective actions can be taken promptly.

Expediently, the present approach uses a solution that scans the network computers segment by segment and provides a combined report of antivirus version, the definition date, whether any files are quarantined and the Software Update Services client configuration, along with other necessary data, which are crucial to ensure that the systems are secure. The solution generates a snap shot report of the security-preparedness of the client computer network which shall be used for checking security audit.

Figure 3:
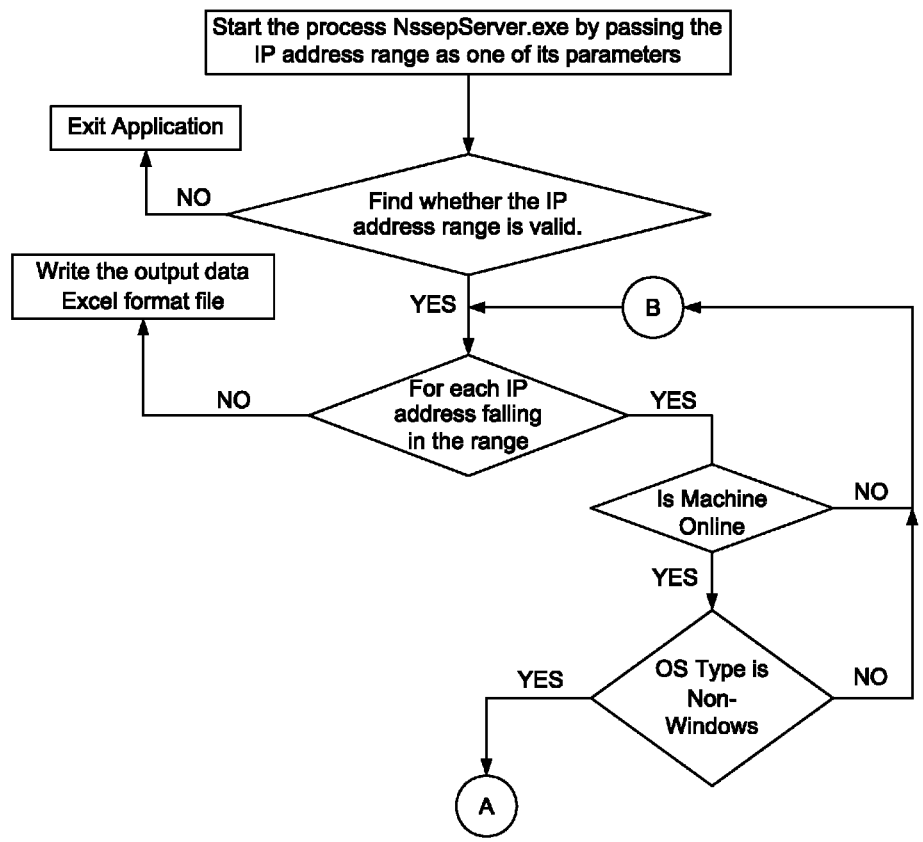
FIG. 3 shows an exemplary flow chart of an IP Address Validation Module used in the present NSSEP.

FIG. 3 illustrates the flow chart for the process in an exemplary IP address validation module. The command prompt compactable version, a unique feature which no other solution in the market offers, can be scheduled and executed through a batch file and hence reducing the engineer's effort significantly. There is no extra software to be installed on the computing (client) machines which are remotely scanned, whereby there is no need to restart the client machines to use this software. There is neither any performance-issue in the client-machines nor any network disturbance while scanning the machines. Even the client-machine users do not become aware of the remote scanning process since it takes place in the background.

The present approach uses software which is scalable, and can be extended to monitor any kind of remotely located computing machine. By extending the present software, a modified report can be generated which supports complete Workstation Security Management including file sharing, the number of user accounts, password protection details, as well as the Workstation Asset Management including hardware and software identification. By extending this software, it is also possible to retrieve the details of patches installed or the missing patches in a remote computer. By using a modified version of the present approach, it is also possible to achieve pushing of files and applications (server push and client pull), and obtaining of back-up of data from remote machines. The present approach can also be extended to scan back bone specific machines in different segments in one shot.

The present NSSEP software in one form is known to have improved the productively on antivirus and patch management to 80%, and also contributed to accomplish a near six sigma level of virus prevention process and patch management with great benefits.

The prior art console provided by different software vendors, which provides the built in antivirus audit function is not as effective as the present NSSEP software, since the prior art console does not detect all the vulnerabilities in all the client machines in the network. For example, the report generated by Symantec console does not contain critical information required by the IT Management Group, as explained herein. Additionally, it takes typically more than twenty five minutes for a full scan of computers in a single segment when the Symantec system is used. In contrast, the NSSEP software displays 100% accuracy and high performance, and finishes each scan typically in two minutes.

The present NSSEP also has a command prompt compactable version, which is a unique feature compared to other solutions the market possesses. Parallel solutions in the market include tools like IPsan® utility and Winpeap® application, which when can only provide MAC address, Machine name or OS name, but do not provide a full spectrum service as the present NSSEP software does.

Figure 8:
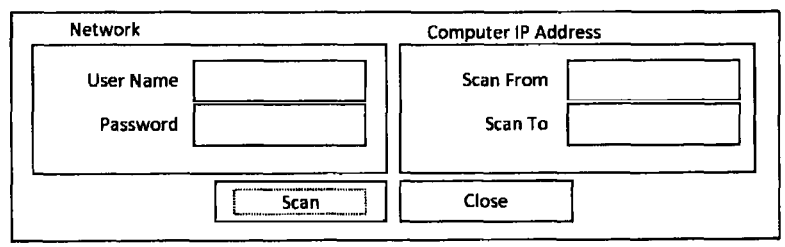
FIG. 8 is an illustration of an exemplary software system comprising MFC Application Executable.

An example of High Level Architecture of the NSSEP:
The exemplary software system consists of an MFC Application Executable in the server side and a service that runs in the remote client machine. The IT engineer runs the Executable (for example, one that is named as NssepServer.exe) from the server machine giving the IP address range as one of the inputs. By way of example only, FIG. 8 illustrates fields present within the MFC Application Executable.

The Executable takes the first IP Address from the list and starts trying to login to that machine. If the machine is not present or not able to be accessed, a corresponding message will be written on the report. Once logged in to the remote machine, the Executable tries to start the service, by assuming that the service is already deployed there. This is done to improve the performance by avoiding any delay in deploying the service in subsequent runs. If the service is not present then the NssepServer.exe copies the service to the client machine and starts it. The same procedure will be followed till the end of IP address in the given segment and at the end, the output will be written into an excel format file.

Server Execution—NssepServer.exe

NssepServer.exe is executed by passing an IP-range as one of its parameters. A new thread is started for IP addresses for a group of 50 (for example). Each IP address will perform the execution of all the above mentioned modules. The IP addresses of all the machines present in the network will be stored in a text file for the Executable's reference.

Server Modules in Detail:

The server modules are not hardware modules but merely software elements installed with the purpose of initiating scanning of the client machines and obtaining an NSSEP report for purposes of monitoring the security-preparedness level of the client machines from several angles as described herein.

IP Address Validation Module with reference to the flow chart in FIG. 3:

The IP address validation module is responsible for validating the following details for any given IP address:
1) Whether the IP address fails in the range specified in the file and in the same segment,
2) To find whether the machine with the IP address responds to the ping command, and
3) To find whether the machine is online and also to find the type of Operating System.

The steps on the flow chart of FIG. 3 are self explanatory.

Figure 4:
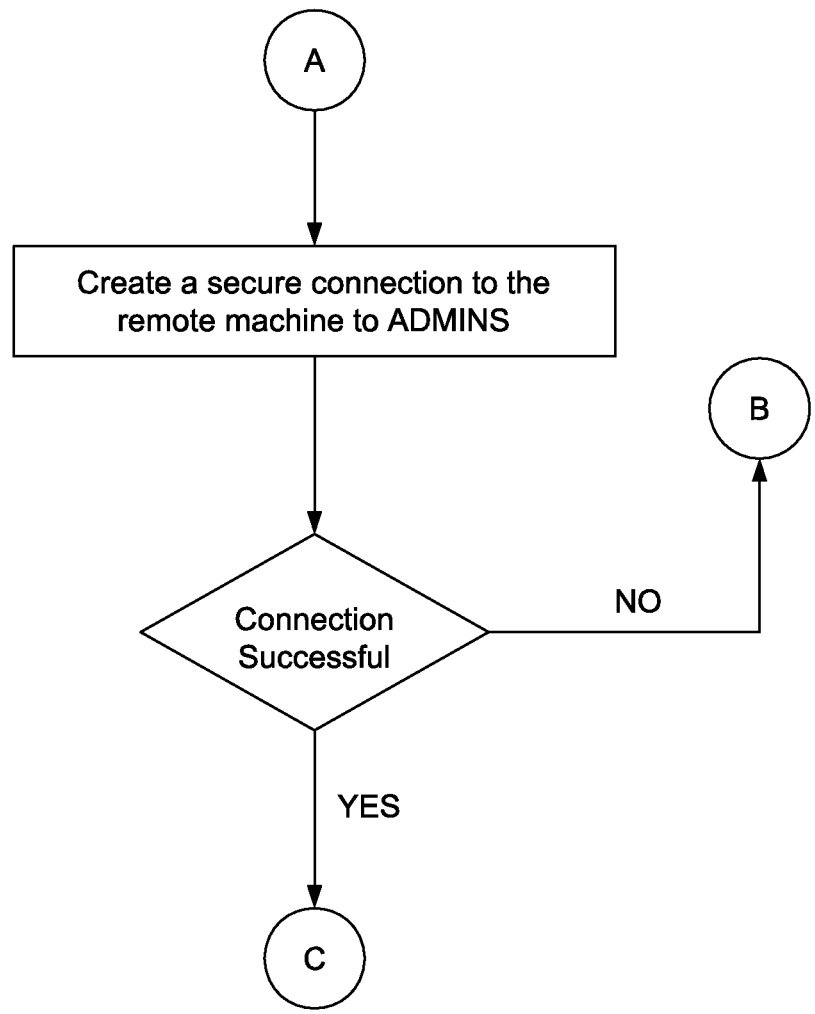
FIG. 4 shows an exemplary flow chart for the Remote Connection Module used in the present NSSEP.

Remove Connection Module with reference to the flow chart in FIG. 4:
1) This module is responsible for establishing a network connection with the remote IP.
2) The WinAPI (Application Programming Interface) is used for establishing the connection by providing the IT Management Group's specific username and password as input given by the IT engineer, who is running this application.
3) Expediently, the connection is attempted for the remote resource "ADMIN$". The connection may not succeed if the user name provided did not have administrator privileges in the remote machine.
4) If the connection was unsuccessful then it gets closed for return.

Figure 5:
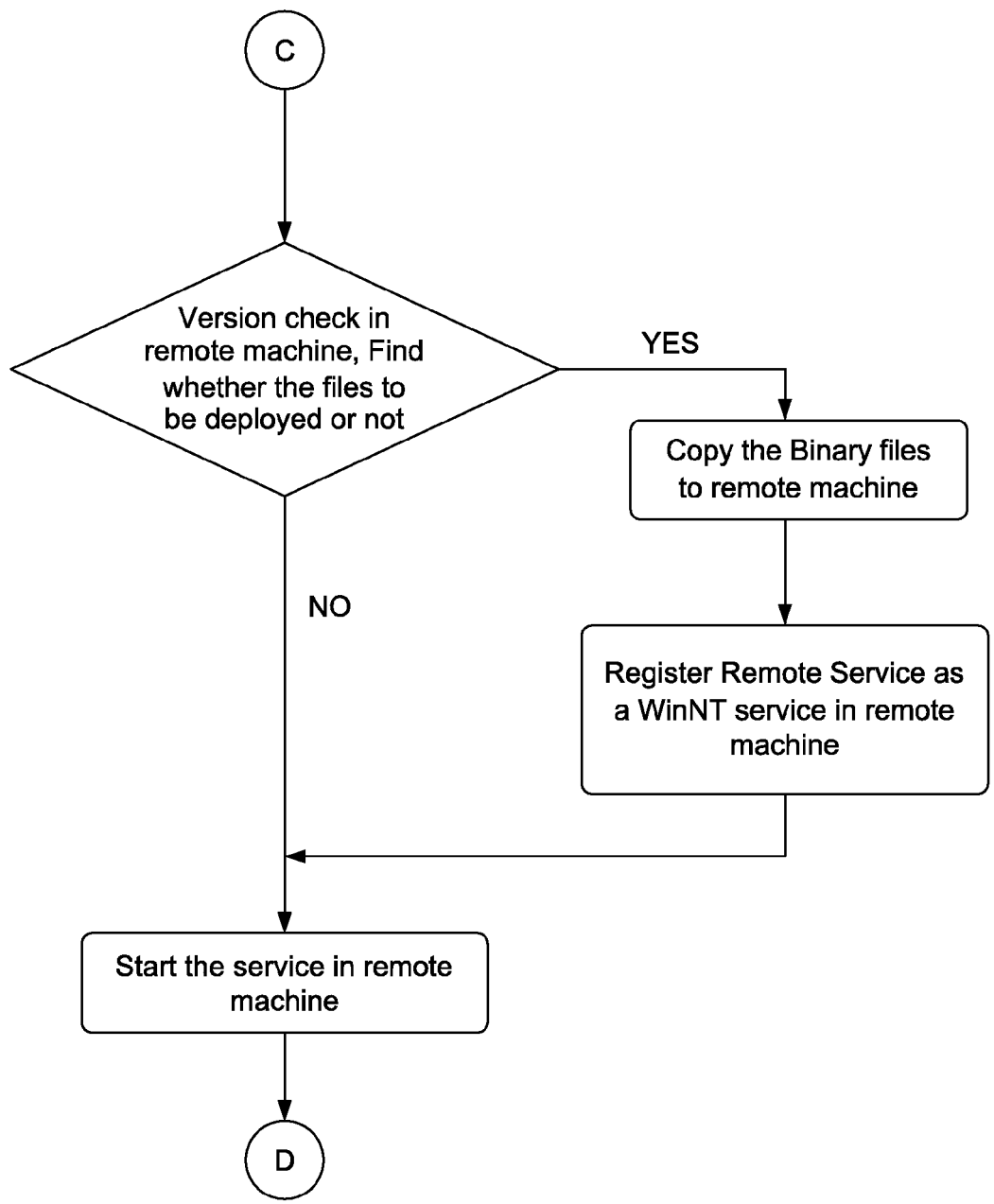
FIG. 5 shows an exemplary flow chart for the Installation Module used in the present NSSEP.

Installation Module with reference to FIG. 5:
1) This module is responsible for the deployment and installation of the binary files (service) in the remote machine.
2) Before deploying the files, the module will check for the already existing installation file in the remote machine, and if it exists then the module checks for the version of the files to be deployed in the remote machine and then decides on whether to deploy the files or not.
3) Upon installation, the module registers the binary as a WinNT service.
4) Upon successful installation and registration of the binary in the remote machine the module then starts the service in the remote machine.

Figure 6:
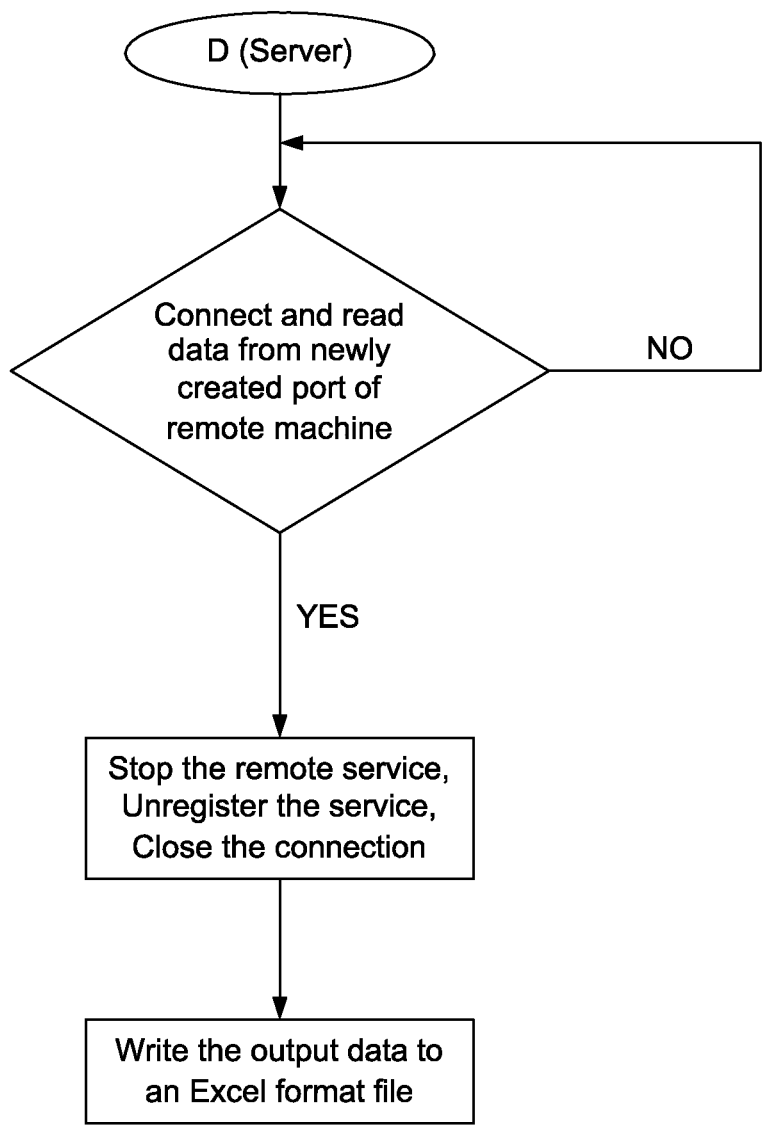
FIG. 6 shows an exemplary flow chart for the Remote Read Module used in the present NSSEP; and, FIG. 7 shows an exemplary flow chart for the Remote Execution—Client Machine used in the present NSSEP.

RemoteRead Module with reference to FIG. 6:
1) After the successful installation of this module, registration and starting of service in Remote machine and the RemoteRead module take place. This module will connect to the port of the remote machine and attempts for reading in the remote machine.
2) The thread will wait for the message to be read from the remote port once it is successfully read, the thread then writes the output message from the remote machine and keeps the message for future use.
3) After the message is successfully read from the remote machine, the Remote Read Module stops the service in the remote machine and unregisters the service from the machine. However the binary in the remote machine is kept to avoid deployment of the file during the next run in the same machine.
4) Then the RemoteRead module will close the network connection opened by Remote connection module, to ensure that there is no unauthorized access from this machine to the remote machine using the supplied username and password after the execution. Also there may be an impact on the performance of the server if too many network connections are opened and left open.
5) Upon completing the execution using this module, the thread for the respective IP address closes by itself leaving in tact the data obtained from the remote client machine. This data is later written preferably on to an excel format file, for example, a CSV (Comma Separated Values) file.

Figure 7:
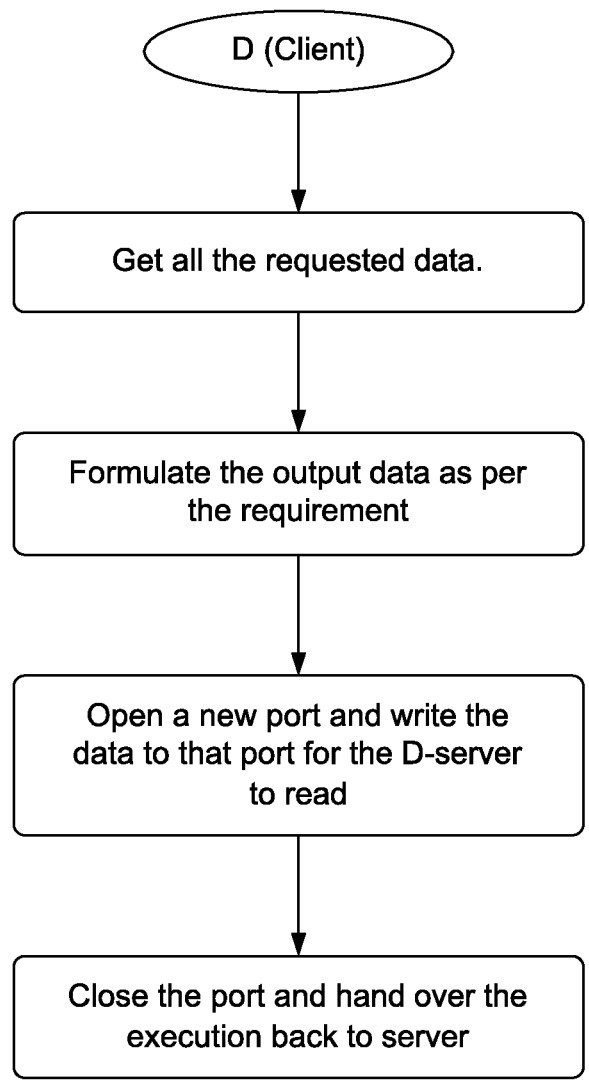

Remote Execution—Client Machine with reference to FIG. 7:

In the flow chart of FIG. 7, after obtaining all the required data, the output data is formulated as per requirement. A new port is opened to write data to the server to read. Thereafter, the port is closed and the execution is handed back to the server.

ReadClientRegistry Module:

Upon starting the service, the module looks for the client windows registry and also executes a few DOS commands as below, locally,
  a. MacID.
  b. Antivirus details like version, parent server and definitions.
  c. Type of OS installation.
  d. Whether there is any file quarantined.
  e. The Software Update Services status for the current machine.

If there are any exception or unknown errors happening while reading the data, then a proper message will be included with the data.

Formulate Output Module:
1) This module is responsible for formulating of the output message with the data received from the ReadClientRegistry module (reference supra).
2) The data is well organized so that there is no editing required and can be written as a string directly into preferably an excel format file, for example, a CSV file, which is to be done by RemoteRead module of FIG. 6 in server.

WriteData Module:
1) This module has the function of opening the port for writing the data received from the earlier module,
2) The default port opened for writing is configured for each network based on the firewall settings.
3) Once the port is successfully opened, the data is written to the port and after writing, the execution will pause till the data is read from the port by RemoteRead module of server.
4) Once it is read, the port is closed, and execution is returned back to service main.

From this point onwards the RemoteRead module taken control of the service and at the end stops and un-registers the service.

It is noted that products from Symantec such as LiveState® Client Management Suite are expensive and do not always meet the requirements of all IT management groups. When such other products are deployed, it would result in an additional cost to the organization in that they have to push patches to make up for the deficiencies.

The present invention includes a computer readable medium encoded with software data/instruction which when executed by a computing platform would result in execution of a method as described and claimed herein. Different embodiments of the present subject matter can be implemented in software which can be used in any suitable computing environment. The embodiments of the present subject matter are also operable in a number of general-purpose or special-purpose computing environments, or processors or processing units. Some computing environments include personal computers, general-purpose computers, server computers, hand-held devices (including, but not limited to, telephones and personal digital assistants (PDAs) or all types), laptop devices, multi-processors, microprocessors, set-top boxes, programmable consumer electronics, network computers, minicomputers, mainframe computers, distributed computing environments and the like to execute code stored on a computer-readable medium or computer memory elements. The embodiments of the present subject matter may be implemented in part or in whole as machine-executable instructions, such as program modules that are executed by a computer. Generally, program modules include routines, programs, objects, components, data structures, and the like to perform particular tasks or to implement particular abstract data types. In a distributed computing environment, program modules may be located in local or remote storage devices.

Computer memory elements can include any suitable memory device(s) for storing data and machine-readable instructions, such as read only memory (ROM), random access memory (RAM), erasable programmable read only memory (EPROM), electrically erasable programmable read only memory (EEPROM), hard drive, removable media drive for handling compact disks (CDs), digital video disks (DVDs), diskettes, magnetic tape cartridges, memory cards, Memory Sticks™, and the like; chemical storage; biological storage; and other types of data storage.

"Processor" or "processing unit," as referred to hereinabove, includes any type of computational circuit, such as, but not limited to, a microprocessor, a microcontroller, a complex instruction set computing (CISC) microprocessor, a reduced instruction set computing (RISC) microprocessor, a very long instruction word (VLIW) microprocessor, explicitly parallel instruction computing (EPIC) microprocessor, a graphics processor, a digital signal processor, or any other type of processor or processing circuit. The term also includes embedded controllers, such as generic or programmable logic devices or arrays, application specific integrated circuits, single-chip computers, smart cards, and the like.

In the foregoing detailed description of embodiments of the invention, various features are grouped together in a single exemplary embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the detailed description of embodiments of the invention, with each claim standing on its own as a separate embodiment. It is understood that the above description is intended to be illustrative, and not restrictive. It is intended to cover all alternatives, modifications and equivalents as may be included within the spirit and scope of the invention as defined in the appended claims. Many other embodiments will be apparent to those of skill in the art upon reviewing the description above. The scope of the invention should therefore be determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., where used are merely labels, and are not intended to impose numerical requirements on their objects.

The invention claimed is:

1. A method of remotely monitoring levels of security preparedness of a plurality of network connected computing machines in an enterprise on a periodic basis for obtaining a report, said method comprising:
    viewing and dividing by a central server a list of said plurality of network connected computing machines into a plurality of segments for remote access based on an internet protocol address range;
    selectively accessing by the central server the network connected computing machines in selected ones of the plurality of segments;
    determining, by the central server, whether one or more security policies present in the selectively accessed computing machines in each of the plurality of segments are up-to-date with the enterprise security policies; and
    generating, by the central server, a combined Network Security Scanner for Enterprise Protection (NSSEP) report based on the determination, wherein the NSSEP report comprises one or more of an IP address, a computer name, a MAC address, an operating system or the one or more security policies comprising one or more of an antivirus version, an antivirus definitions, a software update services (SUS) client configuration, a parent server information, or a quarantined files, the generating further comprises generating the NSSEP report based on the determination to perform a security preparedness, a conformity audit and a suitable correction of the scanned computing machines in a non-intrusive manner.

2. The method as in claim 1 wherein said information comprises files quarantined by a commercial security software, and information relating to software for patch management, wherein at least some of the plurality of the network connected computing machines are located in enterprise network with a client specific operating system (OS).

3. The method as in claim 1 wherein the determining further comprises scanning by the central server the accessed selected computing machines segment by segment in the plurality of segments.

4. The method as in claim 1, further comprising ascertaining from said report as to whether a specific computing machine from those scanned is in conformity with user the enterprise security policies against which computing machines are scanned for conformity.

5. The method as in claim 1, further comprising obtaining by the central server antivirus definition dates for existing commercial security software which the scanned computing machines contain.

6. The method as in claim 5, further comprising remotely scanning includes obtaining by the central server antivirus definition dates for said existing commercial software, irrespective of configuration and user-changes in security software.

7. The method as in claim 1, further comprising remotely scanning for a diagnosed operating system prevailing in any scanned computing machine.

8. The method as in claim 1 including the step of further comprising automating said scanning on a known periodic basis.

9. The method as in claim 8, wherein said periodic basis is chosen from daily or twice daily, or as desired.

10. The method as in claim 1 further comprising configuring by the central server said steps of viewing and remotely scanning for catering the computing machines connected in a network.

11. A method of remotely monitoring levels of security preparedness and patch management of a plurality of enterprise network connected computing machines for an enterprise IT Management Group on a periodic basis to obtain a report, comprising:
viewing and dividing by a central server a list of said plurality of network connected computing machines into a plurality of segments for remote access based on an internet protocol address range;
selectively accessing by the central server the network connected computing machines in selected ones of the plurality of segments with an existing set up and no separate installation of any additional software in any of the plurality of the network connected computing machines;
determining, by the central server, whether one or more security policies present in the selectively accessed computing machines in each of the plurality of segments are up-to-date with the enterprise security policies;
generating, by the central server, a combined Network Security Scanner for Enterprise Protection (NSSEP) report based on the determination, wherein the NSSEP report comprises one or more of an IP address, a computer name, a MAC address, an operating system or the one or more security policies comprising one or more of an antivirus version, an antivirus definitions, a software update services (SUS) client configuration, a parent server information, or a quarantined files, the generating further comprises generating the NSSEP report based on the determination to perform a security preparedness, a conformity audit and a suitable correction of the scanned computing machines in a non-intrusive manner; and
selectively initiating by the central server corrective action to update security preparedness levels and selectively implement patch management of the scanned computing machines as desired by said enterprise IT management Group.

12. The method as in claim 11, wherein at least some of the plurality of the network connected computing machines are located in enterprise network with a client specific operating system (OS).

13. The method as in claim 11 wherein the determining further comprises remotely scanning comprises scanning the accessed selected computing machines segment by segment in each of the plurality of segments.

14. The method as in claim 11, further comprising ascertaining from said report as to whether a specific computing machine from those scanned is in conformity with the enterprise security policies.

15. The method as in claim 11, wherein the determining further comprises remotely scanning includes obtaining by the central server an antivirus definition dates for existing commercial security software which the scanned computing machines contain, wherein said report includes required fields or data of different software vendor's products as desired by said enterprise IT management Group.

16. The method as in claim 11, wherein the determining further comprises remotely scanning includes obtaining by the central server the antivirus definition dates for said existing commercial software, irrespective of configuration and user provisioning of security software.

17. The method as in claim 11, further comprising remotely scanning for a diagnosed operating system prevailing in any scanned computing machine 18. The method as in claim 11 further comprising automating said scanning on a known periodic basis.

19. The method as in claim 18, wherein said periodic basis is chosen from daily or twice daily or as desired.

20. The method as in claim 11 further comprising viewing and remotely scanning by the central server said accessed selected computing machines with users of the scanned computing machines remaining unaware of the scanning, wherein the network connected computing machines may exist in a connected local network.

21. A method as set forth in claim 11 wherein the generating further comprises generating by the central server the NSSEP (Network Security Scanner for Enterprise Protection) report using said information to perform a security preparedness audit of the scanned computing machines in said each one of the plurality of segments based on remotely scanning the accessed selected computing machines.

22. A method of remotely monitoring levels of security preparedness and patch management of a plurality of network connected computing machines for an enterprise IT Management Group on a periodic basis to obtain a report, comprising:
viewing and dividing by a central server a list of said plurality of network connected computing machines into a plurality of segments for remote access based on an internet protocol address range;
selectively accessing by the central server the network connected computing machines in selected ones of the plurality of segments with an existing set up and no separate installation of any additional software in any of the plurality of the network connected computing machines;
determining, by the central server, whether one or more security policies present in the selectively accessed computing machines in each of the plurality of segments are up-to-date with the enterprise security policies;
generating, by the central server, a combined Network Security Scanner for Enterprise Protection (NSSEP) report based on the determination, wherein the NSSEP report comprises one or more of an IP address, a computer name, a MAC address, an operating system or the one or more security policies comprising one or more of an antivirus version, an antivirus definitions, a software update services (SUS) client configuration, a parent server information, or a quarantined files, the generating further comprises generating the NSSEP report based on the determination to perform a security preparedness, a conformity audit and a suitable correction of the scanned computing machines in a non-intrusive manner; and
selectively initiating by the central server corrective action to update security preparedness levels and selectively implement patch management of the scanned computing machines as desired by said IT management Group.

23. The method as set forth in claim 22 wherein the generating further comprises generating by the central server the NSSEP report using said information to perform a security preparedness audit of the scanned computing machines in each one of the plurality of segments based on remotely scanning the accessed selected computing machines, wherein said NSSEP report further includes required fields/data of different software vendor's products.

24. A non-transitory computer readable storage medium encoded with instruction which when executed by a computing platform, results in execution of steps comprising:

viewing and dividing a list of said plurality of network connected computing machines into a plurality of segments for remote access based on an internet protocol address range;

selectively accessing the network connected computing machines in selected ones of the plurality of segments;

determining, whether security policies present in the selectively accessed computing machines in each of the plurality of segments are up-to-date with the enterprise security policies; and generating a combined Network Security Scanner for Enterprise Protection (NSSEP) report based on the determination, wherein the NSSEP report comprises one or more of an IP address, a computer name, a MAC address, an operating system or the one or more security policies comprising one or more of an antivirus version, an antivirus definitions, a software update services (SUS) client configuration, a parent server information, or a quarantined files, the generating further comprises generating the NSSEP report based on the determination to perform a security preparedness, a conformity audit and a suitable correction of the scanned computing machines in a non-intrusive manner.

25. A non-transitory computer readable storage medium encoded with instruction which when executed by a computing platform, results in execution of steps comprising:

viewing and dividing a list of said plurality of network connected computing machines into a plurality of segments for remote access based on an internet protocol address range;

selectively accessing the network connected computing machines in selected ones of the plurality of segments with an existing set up and no separate installation of any additional software in any of the plurality of the network connected computing machines;

determining, whether security policies present in the selectively accessed computing machines in each of the plurality of segments are up-to-date with the enterprise security policies;

generating a combined Network Security Scanner for Enterprise Protection (NSSEP) report based on the determination, wherein the NSSEP report comprises one or more of an IP address, a computer name, a MAC address, an operating system or the one or more security policies comprising one or more of an antivirus version, an antivirus definitions, a software update services (SUS) client configuration, a parent server information, or a quarantined files, the generating further comprises generating the NSSEP report based on the determination to perform a security preparedness, a conformity audit and a suitable correction of the scanned computing machines in a non-intrusive manner; and selectively initiating corrective action to update security preparedness levels and selectively implement patch management of the scanned computing machines as desired by said enterprise IT management Group.

\* \* \* \* \*